United States Patent Office 3,317,350
Patented May 2, 1967

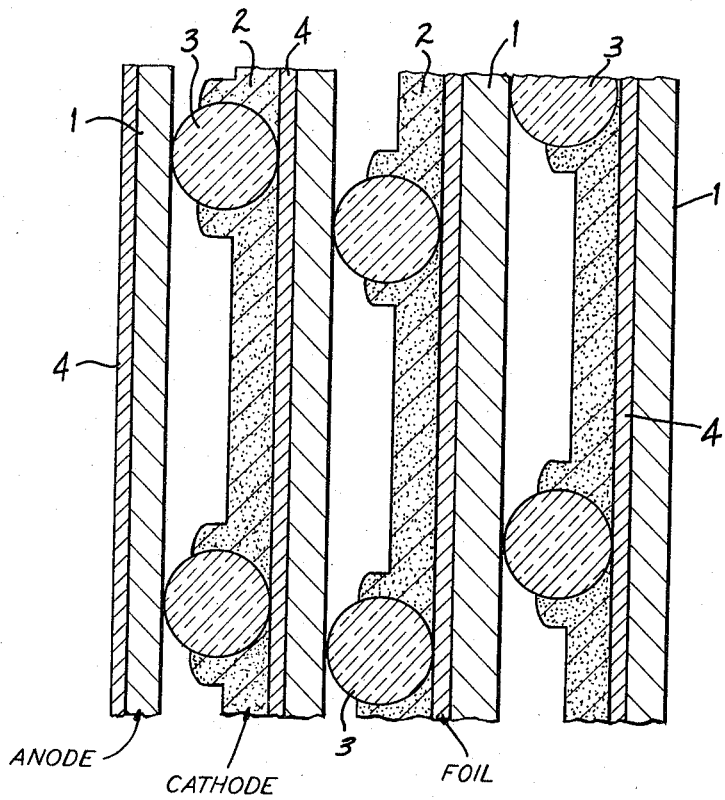

3,317,350
PRIMARY ELECTRIC CELL HAVING A SHEET OF FOIL METALLURGICALLY BONDED TO THE ANODE
James F. Murphy, Hamden, Conn., assignor to Olin Mathieson Chemical Corporation, a corporation of Virginia
Filed Dec. 26, 1963, Ser. No. 333,572
7 Claims. (Cl. 136—100)

The present invention relates to improved metal anodic-cathodic composite elements, especially of aluminum, aluminum base alloys, magnesium, or magnesium base alloys, which may be advantageously utilized in a number of applications, for example, (1) in primary electric batteries suitable for use with liquid or semi-liquid electrolytes, such as aqueous electrolytes, and especially, sea water and (2) in dry cell applications.

The present invention relates to improved structures as aforesaid characterized by significantly improved performance and low cost of manufacture. For example, the improved anodic-cathodic composite structures of the present invention deliver high current densities, decrease the internal resistance of galvanic cells and also result in large economies in the material and fabrication costs. In addition, the improved structures of the present invention will avoid problems in perforation of the walls in galvanic cells. For example, a metallurgically bonded composite of anode material with a more noble metal will, when used in an electrochemically active electrolyte container, resist perforation for much longer than will a container of the anodic material alone.

In the construction of batteries wtih more than one cell in series, it is conventional to attach a thin sheet of foil, for example, silver foil, as a cathode collector in one cell to the metal anodes of the adjacent cell. This procedure has been found to result in high current densities and ease of manufacture. Conventionally the silver cathodic collector in, for example, a sea water battery is taped directly to the aluminum or magnesium anode, back to back. In turn the silver-silver chloride cathode is attached to the silver so that with the use of appropriate spacers a number of these units may be piled on top of one another to produce a battery voltage equal to the number of cells formed. Glass bead spacers or similar structures in the silver-chloride serve as insulating spacers and allow the electrolyte to flow between the silver-silver chloride cathode and the anodic material.

In accordance with the foregoing procedure the silver foil must be cut to size and affixed to the surface of the anodic material of the next cell. This is generally accomplished by taped edges but may also be done by other means, such as conducting adhesives. In either case considerable expense both in terms of labor and materials are required in order to affix the silver foil. Despite the expense, however, the result is not fully adequate from an electrochemical point of view due to numerous factors. For example, attachment by either edge taping or adhesive bonding will allow the entry of the electrolyte into the space between the silver and anodic material. Electrolyte entry between these two may constitute a cell working in the direction opposite to that desired. Even if insufficient electrolyte is present between the foil and the anodic material to cause the formation of a reverse electrolyte cell, interreaction between the two materials in the presence of even minor amounts of electrolyte can and often does lead to high resistance corrosion product films and to loss of the active anodic material.

Therefore, it is the principal object of the present invention to provide an improved anodic-cathodic composite material which provides significantly improved performance while overcoming the foregoing disadvantages.

It is a further object of the present invention to provide an improved anodic-cathodic composite material in an inexpensive manner.

Further objects and advantages of the present invention will appear hereinafter.

In accordance with the present invention it has been found that the foregoing objects and advantages and others may be readily acomplished by providing a composite article comprising a metal anode, especially a metal anode of an aluminous or magnesium or zinc metal, that is, aluminum or an aluminum base alloy, or magnesium or a magnesium base alloy, or zinc or a zinc base alloy, said anode having metallurgically attached thereto a sheet of foil selected from the group consisting of silver, copper, gold and platinum. The article of the present invention is especially useful in a primary battery, particularly a sea water battery, said primary battery containing in combination the anodic-cathodic composite of the present invention, a consumable unpolarized cathode or cathode depolarizer and a liquid or paste electrolyte.

The present invention is readily applicable to any metal anode, since it has been found that improved results are obtainable by the simple metallurgical bonding procedure. However, the preferred anodic materials are the magnesium, zinc and aluminum anodes and base alloys of each.

Typical aluminum and magnesium base alloys which may be used include, but are not limited to, high purity magnesium, high purity aluminum, aluminum alloy 7072, aluminum alloys containing small amounts of calcium, magnesium alloy AZ61, a magnesium alloy containing about 6 percent aluminum, 1 percent zinc, 0.3 percent manganese and the balance magnesium, aluminum base alloys containing varying portions of alloying ingredients, such as, for example, up to 10 percent zinc, aluminum base alloys containing at least 90 percent aluminum and from 0.04 to 0.5 percent tin as discussed in United States patent application Ser. No. 251,024, now U.S. Patent 3,189,486.

Preferably the tin is retained in solid solution to the maximum degree, i.e., about 0.1 percent, with the excess tin or a suitable third ingredient being provided as taught in co-pending Ser. No. 60,166 filed Oct. 3, 1960, now U.S. Patent 3,180,728, to improve uniformity of corrosion and to improve anodic efficiency.

The preferred manner of preparing the alloys in the above-identified co-pending patent application is to heat the aluminum-tin sample at elevated temperatures, e.g., between about 570–640° C. for a sufficient period of time to dissolve the maximum amount of tin and to redistribute excess tin or other alloying additions in a course, particulate form which produces maximum uniformity of attack and power efficiency. Generally, the heating period within the preferred temperature range may vary between 15 minutes and 24 hours. After the heating period the sample is cooled rapidly, for example, by immersion in a large volume of water at ambient temperatures. For simplicity, this treatment may be termed "homogenization treatment."

The sheet of foil material may be metallurgically bonded to the metal anode in any conventional manner. The metallurgically bonded foil should completely cover one face of the anode. The metallurgical bonding produces minimum electrical resistance between anodic and cathodic elements and prevents entry of electrolyte between the elements. Metallurgical bonding is used herein in its conventional sense, i.e., intimate metallic contact with intermixing or alloying to cause adhesion. This is the critical feature of the present invention and it is this feature which provides the advantages of the present invention. It is surprising that so simple an expedient as metallurgical bonding can cause such significant improvements as are obtained in accordance with the present invention.

In the primary cell of the present invention it is preferred to utilize solid, fused silver chloride as a cathode. Alternatively, any silver salt may be utilized as the cathode material, provided the salt is at least as soluble as silver chloride, but sufficiently insoluble to avoid disintegration of the cathode during operation of the cell. Among such other cathodic materials which may be employed are silver oxide, silver chromate, silver sulfate, silver phosphate, silver acetate and silver carbamate. In addition, cuprous salts may be readily employed. Cells may be formed with cathodes of silver salts more insoluble than silver chloride, such as silver bromide and silver iodide, but the voltage is considerably lower since the cathodic material is much more insoluble than the silver chloride. Exemplificative copper compounds include preferably copper oxides.

The electrolytes which may be employed are broadly any liquid or paste electrolyte and preferably the liquid-aqueous type electrolytes. The liquid electrolyte which should be employed should, in addition to being liquid at operating temperatures, be one which does not polarize the anode or the cathode and one free from inhibitive action on the anode. Any of the conventional paste electrolytes may be employed, for example, the chloride paste electrolytes commonly used in dry cells.

The primary cell of the present invention is especially adapted to utilizing sea water as the electrolyte; however, it is apparent that the cells and batteries of the present invention will operate advantageously in electrolytes other than sea water, for example, any aqueous solution of sodium chloride may be conveniently employed, such as a 3.5 percent aqueous solution of sodium chloride. Similarly, other alkali metal chlorides or alkaline earth metal chlorides will be satisfactory. Other suitable electrolytes, weak or strong, dilute or concentrated may be conveniently employed. Normal surface or well water also yields an operative battery although a considerable time may be required before the battery reaches its full capacity. Exemplificative of the non-aqueous type electrolytes include fused sodium chloride or potassium chloride, including low melting alkali halide eutectics, and organic solvents capable of dissolving salts.

Naturally, the primary battery of the present invention may be prepared by any of the conventional means well known in the art. In the preparation of the primary battery of the present invention, for example, the anode and cathode material may be separated in the same cell or spaced apart by any conventional means, for example, thin films of a chemically stable material, such as nylon may be adhered to the anode material. If the particular battery under consideration is intended to operate at a high current density, the electrodes in each cell should be more closely spaced. In a cell or battery not intended to operate at high current densities close spacing is not required. In the low current density batteries, rubber strips or tabs at the edges of the electrode sheets may be employed.

The cathode material may be prepared by any of the conventional means, for example, cast sheets of substantial thickness may be employed or rolled silver chloride may be produced by suspending a body of silver, such as silver screen, in a dilute chloride solution for a time sufficient to form a silver chloride coating of the desired thickness. Other means for preparing the cathodic material are well known in the art. It is preferred to set up a plurality of the primary cells spaced from one another so that individual cells are established between the plates of succeeding electrodes when immersed in an electrolyte.

For purposes of illustration, a representative battery structure is shown in the drawing. As shown in the drawing, each cell of the battery is made up of a thin anode sheet 1 spaced from a thin cathode sheet 2 by small glass spheres 3 embedded in the cathode sheet and possessing a diameter greater than the thickness of the cathode sheet. Foil material 4 is metallurgically bonded to the anode 1 and serves as a cathode collector which prevents electrochemical interaction between the anode and cathode and provides the advantages discussed heretofore. The battery itself is made up of a pile of these individual cells, the drawing representing a sampling thereof.

The present invention will be more readily apparent from a consideration of the following illustrative examples.

*Example*

A battery structure was prepared in a manner after the battery shown in the drawing, with the anode an aluminum base alloy containing 0.3 percent tin with copper foil metallurgically bonded thereto and with a cathode of fused, solid silver chloride. For comparison purposes an identical cell was prepared, except that the copper foil was bonded to the aluminum anode with a silver filled epoxy glue.

The cells were tested after dry storage for one month and after humid storage for one month at 80° F and 80 percent relative humidity. The results in the following table show the generally superior results of the article of the present invention.

In the following table cell A represents the cell with the copper metallurgically bonded and cell B represents the cell with the copper glued.

TABLE

| Cell | Storage Condition | Amps at 6 Sec. | Maximum Current One Ohm Load | | Maximum Current Density No. Load, Amps/ sq. in. | Percent Efficiency Based on Weight Loss | Average Output for 30 Minutes, kw.-min./lb. |
|---|---|---|---|---|---|---|---|
| | | | Amps | Amps/ sq. in. | | | |
| A | Dry | 0.70 | 0.98 | 0.54 | 2.1 | 73 | 56.8 |
| A | Humid | 0.48 | 1.00 | 0.44 | 1.9 | 65 | 49.5 |
| B | Dry | 0.66 | 0.96 | 0.45 | 1.9 | 47 | 35.7 |
| B | Humid | 0.46 | 1.00 | 0.44 | 1.7 | 64 | 49.5 |

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. In a primary cell containing a consumable, unpolarized cathode, an electrolyte and a metal anode selected from the group consisting of magnesium, zinc and aluminum, the improvement in combination therewith which comprises said metal anode having a sheet of foil metallurgically bonded thereto to one face of said anode, said bond extending substantially throughout the extent of said one face of said anode, said foil being selected from the group consisting of silver, gold, platinum and copper.

2. A cell according to claim 1 wherein said electrolyte is sea water.

3. A cell according to claim 1 wherein said metal anode is an aluminous metal anode.

4. A cell according to claim 1 wherein said metal anode is a magnesium metal anode.

5. A cell according to claim 1 wherein said metal anode is a zinc metal anode.

6. A cell according to claim 1 wherein said metal anode is an aluminum base alloy containing at least 90 percent aluminum and between .04 and 0.5 percent tin.

7. A cell according to claim 6 wherein the tin is retained in solid solution to the maximum degree.

References Cited by the Examiner

UNITED STATES PATENTS

| | | | |
|---|---|---|---|
| 2,258,492 | 10/1941 | Hensel et al. | 75—173 X |
| 2,562,906 | 8/1951 | Hadley | 136—137 X |
| 2,565,544 | 8/1951 | Brown | 204—148 |
| 2,988,587 | 6/1961 | Haring | 136—90 |
| 3,178,316 | 4/1965 | Wilke | 136—90 X |
| 3,189,486 | 6/1965 | Pryor et al. | 136—100 |

WINSTON A. DOUGLAS, *Primary Examiner.*

B. J. OHLENDORF, A. SKAPARS, *Assistant Examiners.*